March 1, 1955  C. GLINKA  2,703,151
SEPARATION OF FINELY DIVIDED SOLID MATERIAL FROM GASES
Filed Jan. 24, 1951

Inventor:
Carl Glinka
BY Burgess + Dinklage
attorneys

United States Patent Office 2,703,151
Patented Mar. 1, 1955

2,703,151

SEPARATION OF FINELY DIVIDED SOLID MATERIAL FROM GASES

Carl Glinka, Krefeld-Uerdingen, Germany

Application January 24, 1951, Serial No. 207,476

Claims priority, application Germany April 5, 1950

1 Claim. (Cl. 183—32)

This invention relates to new and useful improvements in the separation of finely divided solid material from gases. It is especially useful for separating fly ash from furnace gases which have left the combustion chamber.

Ash-free gases, such as furnace gases, are particularly required when it is desired to transmit the heat of such gases to a liquid or to air by way of heat conductors, in which case a precipitation of ash upon the heat transfer surfaces would unfavorably influence the efficiency of the system. Also in cases of direct transfer of combustion heat to a product which is dried and heated, fly ash free gases are required, if it is desired that the material to be treated be kept free from ash mixture. Of importance are fly ash free furnace gases which are developed under pressure, the heat of which is to be directly converted into mechanical energy. Such gases must be dust free, since any dust carried therein would interfere with the mechanical components of the power system.

The problem of separating solid particles from gases containing the same occurs in many industries. In some cases a gas which has been brought into contact with a solid material carries with it small particles of this material, which have to be recovered either because: (1) the material is too valuable to be wasted, (2) the material is poisonous, or (3) the material spoils the gas, which has to be consumed in a cleaned condition.

In accordance with the invention the particles which are carried in the gases are caused to come into contact with guide surfaces which are at a temperature above the melting point of the material of said particles. Thus the particles are withheld by the molten material covering the guide surface, and the particles increase the thickness of this cover of molten material, which then drips off the surfaces. The contacting of the particles with the guide surfaces to which these particles adhere is obtained by subdividing the high temperature gas current into small partial currents and changing the direction of flow of these partial currents by the use of the guide surfaces. Because of the preferably substantially non-linear gas passages and the relatively small distances of the guide surfaces from each other, the mass velocity of the particles causes the same to be brought into contact with the guide surfaces. They then melt to a substantially flowing layer, which drips off the ends of the melting or guide surfaces. The descending drops are relatively so heavy with respect to the gas stream that they are no longer carried thereby. The melting surfaces may be so arranged, if desired, that the molten material running off these surfaces, is directly passed into a collector reservoir. The degree or extent of separation increases with increasing resolution of the gas stream. This, however, also increases the danger of clogging the gas passages. But this may be balanced by increasing the temperature of the guide surfaces, thereby obtaining a more readily liquid flux of the molten particles. The increasing of the temperature of the guide surfaces may be effected by different means, e. g., by increasing the temperature of the gas, or by using heating means within hollow bodies, the surfaces of which serve as guiding surfaces.

According to this method sulphur particles carried with a gas flow can be easily and effectively separated by passing the gas through several layers of tubes arranged in small interspaces and heated to a temperature above the melting point of the sulphur.

The separation of fly ash from hot gases is accomplished in accordance with the invention by the removal of the ash in molten form. The melting of ash has been previously carried out in the combustion chambers of coal dust furnaces. In these prior devices, however, only 60%, and in the recently developed cyclone furnaces, at most 80%, of the fly ash is separated during the course of the combustion process. The remaining ash is carried by the furnace gases through the subsequent heating process in which a portion of the ash is separated, while the balance of the ash is finally precipitated in the dust separator.

According to the invention the ash particles which are carried in the hot gases adhere to the hot surfaces which guide and subdivide the gas flow. The particles adhering to these guide surfaces are in the molten state and flow downward off the ends thereof.

In a power generating process involving the direct conversion of furnace gas heat into mechanical energy, the separation of the ash may be obtained from a furnace gas which is under pressure by an electrically heated separator.

The electric current required for the heating of the separator constitutes in such a case, a portion of the current generated by the device. The amount of electric energy necessary for this purpose is then made up by the increase in temperature of the furnace gases when the same pass through the highly heated separator and by the subsequent power-generating process in a higher temperature range with a corresponding, more efficient operation. The capacity to do work by reason of volume change of the furnace gases is increased by the temperature increase and the expansion of the gases results in the utilization of a greater temperature differential, that is, more heat is converted into mechanical energy than is the case in a power generator operating under otherwise similar operating conditions except for a lower temperature range. The high temperature gases passing out of the power generator may be furthermore utilized in a subsequent heat or power-generating procedure.

The required high temperature necessary for the electrically heated separator may be obtained in any suitable manner, such as by resistance heating, induction heating, or arc heating. The regulation of the temperature is in all cases easily accomplished.

In a power-generating process of the above indicated type, the furnace gases may, for example, be under an operational pressure of about 12 atmospheres. The volume of the gases is accordingly only $\frac{1}{10}$ of the volume of furnace gases under atmospheric pressure. Inasmuch as the cross-sections of the gas passages decrease in the same proportion, it is, therefore, possible to use highly efficient, heat-proof material for the same. Such suitable materials are ceramic materials composed of substantially pure oxides and compounds thereof and, among others, aluminium, magnesium, zirconium, or thorium oxide, the melting temperatures of which all lie above 2000° C. The jacketing of the separator is to be protected by a water conduit construction.

The drawings illustrate various devices or embodiments for the carrying out of the method in accordance with the invention and principally designed for use with furnace gases obtained in the combustion of substantially solid fuel.

Figure 1:
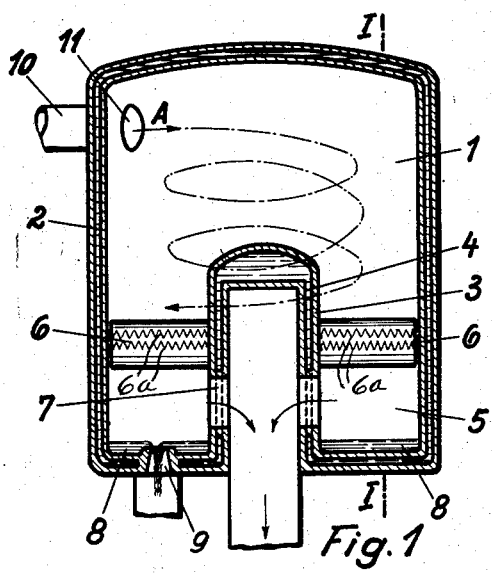
Fig. 1 is a longitudinal section through a separator showing resolution of a hot gas current by way of deflecting surfaces.
Figure 2:
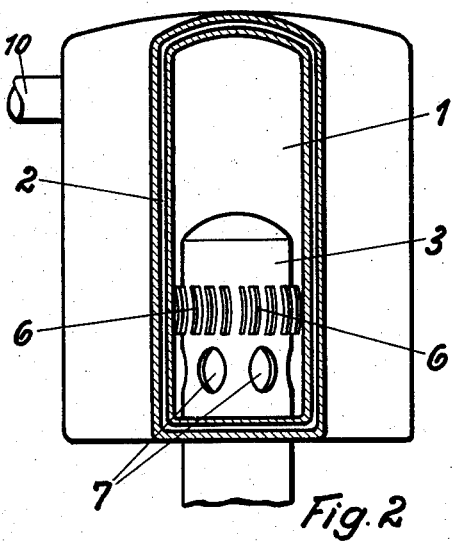
Fig. 2 illustrates a section through the construction shown in Fig. 1 at a right angle thereto.

The arrangement in accordance with Figs. 1 and 2 comprises a substantially vertical, cylindrical chamber 1, the walls of which are cooled by a cooling water jacket 2. A cylinder 3 is concentrically arranged within chamber 1, the walls of cylinder 3 being also cooled by a cooling water jacket 4 which is preferably in communication with the cooling water jacket 2. Radial plates or the like 6 are arranged within the annular chamber 5 defined by and between the cylinders 1 and 3, the radial plates 6 being vertically somewhat concave in form similar to turbine blades. Cylinder 3 is provided with openings 7 below the plates 6, the openings communicating between the annular chamber 5 and the inside of cylinder 3. The lower portion 8 of annular chamber 5 defines a slag bed and is provided with one or more slag taps 9.

The fly ash carrying, highly heated furnace gases enters through inlet duct 10, which is in communication with chamber 1 by way of the eccentric opening 11. By reason of the eccentric entrance of the furnace gases the same are moved in the direction corresponding approximately to the broken line spiral A. Plates 6 deflect the gas current, subdividing the same into a large number of smaller gas currents. The plastic ash particles carried in the gases are brought into contact with the plates 6 by reason of this deflection and are melted upon the same to form a layer of substantially liquid slag which then drops off the plates 6 the plates 6 may be heated by conventional heating means, such as the electrical heating means 6a. The gases pass out of the device through the openings 7 and the interior of cylinder 3, while the slag drips into the slag bed 8. Inasmuch as all ash particles which come into contact with the liquid slag layer on the plates 6 will adhere thereto, and since the arrangement and form of the plates 6 is such that all of these ash particles will necessarily have to come into such contact, the gas moving out of the device is substantially ash-free without having appreciably lost velocity or temperature.

It is also possible to use the upper portion of the chamber 1 as a combustion chamber, such as could be effected by arranging a coal-dust combustion nozzle within the opening 11. Chamber 1 must then be so dimensioned that the combustion will proceed therein to such an extent that the same is finished by the time the combustion gases reach the plates 6.

Figure 3:
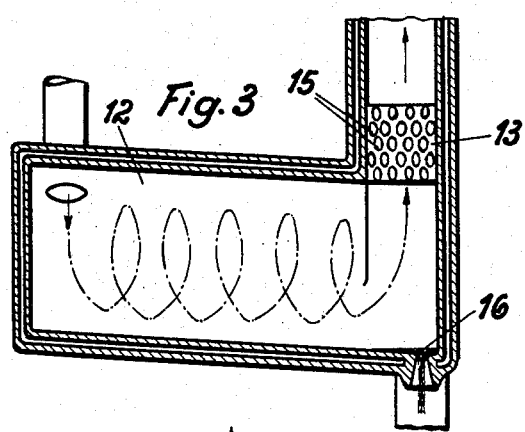
Fig. 3 shows a longitudinal section through a separator arrangement having an additional heater.
Figure 4:
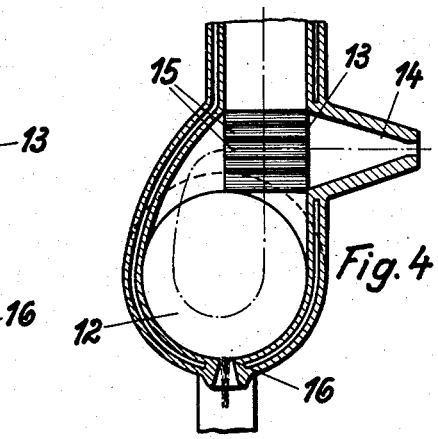
Fig. 4 illustrates a cross sectional side view of the construction of Fig. 3 at a right angle thereto.

In the arrangement according to Figs. 3 and 4 the combustion gas is spiraled through a cylindrical combustion chamber 12 having an axis slightly inclined towards the horizontal. The gases pass out of the device upwardly through an ash separator 13. Ash separator 13 is heated by passing the combustion gases of an additional heating arrangement 14, which is fired with gas or oil and preheated air for combustion, through the ducts 15 of the separator 13. They are then passed into the heating chamber 12 and are there mixed with the furnace gases that pass away, as indicated in the broken arrow line of Fig. 4. The ash particles of the furnace gases will then adhere to the outer surfaces of ducts 15, which become coated with liquid slag material, the liquid slag dripping thereafter into the slag bed 16, from whence the same may be drawn off.

Figure 5:
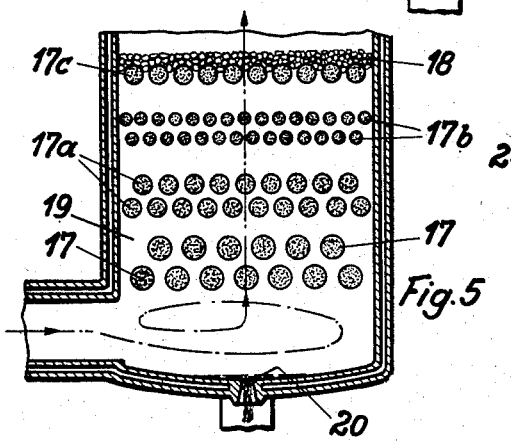
Fig. 5 is a side view and cross section of a further embodiment in accordance with the invention, showing electrical heating of separator surfaces.

In accordance with the arrangement shown in Fig. 5 ceramic hollow bodies 17 are provided as separators for the fly ash. These hollow bodies are filled with a resistor mass through which an electric current is passed so that body 17 will be heated to a temperature above the liquefaction temperature of the ash. The resistance or resistor material may, for example, be a granulated mixture of carbon with silicon carbide and silicate. The hollow bodies 17 may vary in form and arrangement, depending upon the particular separation procedure. In the arrangement according to Fig. 5 several rows of different hollow bodies of this type are arranged one above the other. The hollow bodies 17 in the lower row have a relatively large diameter and are spaced a relatively large distance from each other. The next upper row of hollow bodies 17a are of somewhat smaller diameter, and these bodies are placed at a somewhat lesser distance from each other, while the next upper row of hollow bodies 17b are still further closely spaced. Upon a still further row of hollow bodies 17c a granulated filter mass 18 is provided.

The furnace gases laden with fly ash enter cylindrical chamber 19, in which the aforementioned rows of the hollow bodies 17—17c are provided. The furnace gases enter in such a manner that they have to conform to a somewhat rotary motion and will then pass in between the hollow bodies 17—17c, as indicated by the broken arrow line. The ash particles will be deposited in plastic condition upon the hollow bodies 17—17c, will be thereon liquefied, and will thereupon drip into the slag bed 20 from whence they may be drawn off. Because of the differential distances between the hollow bodies 17—17c from one another the clogging of the interspaces between the hollow bodies is substantially avoided. A portion of the ash particles will usually become deposited upon the hollow bodies 17, while a further portion will become deposited upon the upper hollow bodies 17a, 17b and 17c. Because of this stagewise separation of the ash, the interspaces between the first separators do not become clogged, and additionally, such a superior ash separation is obtained that the resulting gases may be passed through a filter for the removal of the final remnant of ash constituents. This remnant ash dust is thus absorbed by the filter mass 18, so that the gases are substantially purified as they exit. The filter mass 18 may be eliminated in many cases, if desired.

Figure 6:
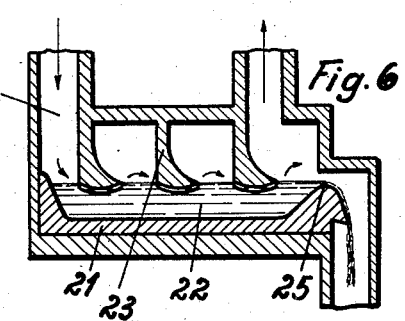
Fig. 6 shows a cross sectional side view of a still further embodiment of a separator utilizing a metal bath.

In the arrangement, according to Fig. 6, the purification of the furnace gases is accomplished by passing the same through a metal bath, which is either maintained in the molten condition of the metal by the temperature of the furnace gases, or by an additional heating arrangement, such as an electric heater. In the schematic representation of Fig. 6, the lower portion of the separator is formed as a tub 21, of fireproof material, containing the liquid metal substantially maintained at a temperature corresponding to the temperature of the furnace gas. Separating walls 23 dipping into the bath 22 force the furnace gases which are admitted by way of a duct or channel 24, to pass into the metal bath. The arrows indicate the path of the gases.

Separating walls 23 are preferably provided longitudinally with a relatively large number of projections, such as serrations, so that the furnace gases may be resolved into a large number of smaller partial gas currents. The ash particles are separated in the liquid metal and form a slag layer floating on top of the metal bath, which layer may be drawn off at an appropriate point 25.

The drawings are only represented by way of schematic illustration. In the practical application, the type, capacity and expected load of the construction should be considered, as well as the selection of construction material. It is usually desirable to construct the wall of the furnace or combustion room and the walls of the rooms in which slag separation or collection is accomplished, of substantially fireproof materials of high quality. It is further of advantage, and oftentimes desirable, to substantially cool these walls by a suitable conventional water jacket arrangement.

I claim:

Device for the separation of fly ash from hot gases containing the same, which comprises a multiple number of downwardly slanting walls defining gas passages therebetween, means for passing such gases to and through said passages and into contact with said walls, means for heating said walls to a temperature above the melting point of said fly ash, slag collector means below and in slag receiving communication with said walls, and means communicating with the exit end of said passages for passing ash free gas out of said device.

References Cited in the file of this patent

UNITED STATES PATENTS

| Number | Name | Date |
|---|---|---|
| 746,259 | Baggaley | Dec. 8, 1903 |
| 1,121,532 | Newberry | Dec. 15, 1914 |
| 1,366,655 | Haslup | Jan. 25, 1921 |
| 1,478,750 | McElroy | Dec. 25, 1923 |
| 1,548,839 | Henshall | Aug. 11, 1925 |
| 1,560,202 | Brassert | Nov. 3, 1925 |
| 1,972,884 | Gleason et al. | Sept. 11, 1934 |
| 2,386,390 | Fernelius et al. | Oct. 9, 1945 |
| 2,409,558 | Gunn | Oct. 15, 1946 |